US010872304B1

(12) United States Patent
Eisenmann et al.

(10) Patent No.: US 10,872,304 B1
(45) Date of Patent: Dec. 22, 2020

(54) PRE-FLIGHT FABRICATION AND ASSEMBLY OF AERIAL VEHICLES

(71) Applicant: Amazon Technologies, Inc., Seattle, WA (US)

(72) Inventors: Shmuel Eisenmann, Seattle, WA (US); Howard Lee Huddleston, Jr., Seattle, WA (US); Christopher Andrew Keisner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 453 days.

(21) Appl. No.: 15/713,122

(22) Filed: Sep. 22, 2017

(51) Int. Cl.
| G06Q 10/08 | (2012.01) |
| G05D 1/00 | (2006.01) |
| B29C 64/393 | (2017.01) |
| B64D 1/12 | (2006.01) |
| B33Y 30/00 | (2015.01) |
| B64C 39/02 | (2006.01) |

(52) U.S. Cl.
CPC ......... *G06Q 10/083* (2013.01); *B29C 64/393* (2017.08); *B33Y 30/00* (2014.12); *B64C 39/024* (2013.01); *B64D 1/12* (2013.01); *G05D 1/0088* (2013.01)

(58) Field of Classification Search
None
See application file for complete search history.

(56) References Cited

U.S. PATENT DOCUMENTS

| 9,817,396 B1* | 11/2017 | Takayama | G05D 1/0038 |
| 10,029,787 B1* | 7/2018 | Lesser | B64C 39/02 |
| 10,043,397 B2* | 8/2018 | Salentiny | G08G 5/0091 |
| 10,163,357 B2* | 12/2018 | Venkatraman | B64C 39/024 |
| 2015/0120094 A1* | 4/2015 | Kimchi | B64C 39/024 701/3 |
| 2015/0203200 A1* | 7/2015 | Bye | B64C 39/024 244/13 |
| 2015/0336671 A1* | 11/2015 | Winn | B64C 39/024 701/3 |
| 2015/0370251 A1* | 12/2015 | Siegel | G05D 1/0027 701/2 |
| 2016/0111006 A1* | 4/2016 | Srivastava | G08G 5/0069 701/3 |
| 2016/0236790 A1* | 8/2016 | Knapp | B64C 11/44 |
| 2017/0180460 A1* | 6/2017 | High | H04L 67/04 |
| 2017/0313421 A1* | 11/2017 | Gil | B64D 1/00 |

(Continued)

OTHER PUBLICATIONS

M. I. Khan, et. al., Design, fabrication & performance analysis of an unmanned aerial vehicle, AIP Conference Proceedings 1754, 060007 (2016); pp. 1-8;) (Year: 2016).*

*Primary Examiner* — Justin C Mikowski

(74) *Attorney, Agent, or Firm* — Athorus, PLLC

(57) ABSTRACT

Systems and methods for pre-flight fabrication and/or assembly of various configurations of aerial vehicles are described. Operations of various configurations of aerial vehicles may be analyzed using models based on various inputs, which inputs may be related to routes, environments, vehicles, components, or other factors. A particular configuration may be selected for a selected route and associated task based at least in part on a desired optimization parameter. Then, the particular configuration of the aerial vehicle may be fabricated and/or assembled to complete the associated task via the selected route.

20 Claims, 7 Drawing Sheets

(56) References Cited

U.S. PATENT DOCUMENTS

| | | | |
|---|---|---|---|
| 2018/0072404 A1* | 3/2018 | Prager | G05D 1/0202 |
| 2018/0072418 A1* | 3/2018 | Shannon | B64D 17/383 |
| 2018/0072421 A1* | 3/2018 | Prager | B64D 1/22 |
| 2018/0356823 A1* | 12/2018 | Cooper | G08G 5/0034 |
| 2019/0100314 A1* | 4/2019 | Prager | B66C 1/38 |

* cited by examiner

| Optimization Factors | | | | | | | |
|---|---|---|---|---|---|---|---|
| Efficiency | Range | Thrust | Torque | Noise | Flight Dynamics | ⋯ |
| Config1 | Config2 | Config5 | Config4 | Config1 | Config4 | ⋮ |
| Config2 | Config1 | Config4 | Config5 | Config3 | Config5 | |
| Config3 | Config4 | Config6 | Config7 | Config4 | Config8 | |
| ⋯ | ⋯ | ⋯ | ⋯ | ⋯ | ⋯ | |

340a, 340b, 340c, 340d, 340e, 340f, 340n

330

Inputs:
- Route
- Environment
- Vehicle
- Available Components
- Manufacturable Components
- ⋯

PRE-FLIGHT FABRICATION AND ASSEMBLY OF AERIAL VEHICLES

BACKGROUND

Aerial vehicles, such as automated aerial vehicles, may be used for various purposes including photography, hobbyism, delivery, or others. Generally, an aerial vehicle is designed with particular specifications suitable for its intended use or purpose. As a result, an aerial vehicle well-suited for one purpose, such as photography, may not be well-suited for another purpose, such as stunt or acrobatic flight. Further, an aerial vehicle well-suited for a particular purpose, such as photography of natural scenery, may not be well-suited for this same purpose in different environments or conditions, such as inclement weather. Accordingly, there is a need for systems and methods for real-time manufacture and/or assembly of an aerial vehicle that is suitable for its intended purpose, taking into account both internal and external factors related to such purpose.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a table of an example simulation output associated with a plurality of configurations of aerial vehicles, according to an implementation.

Figure 1:
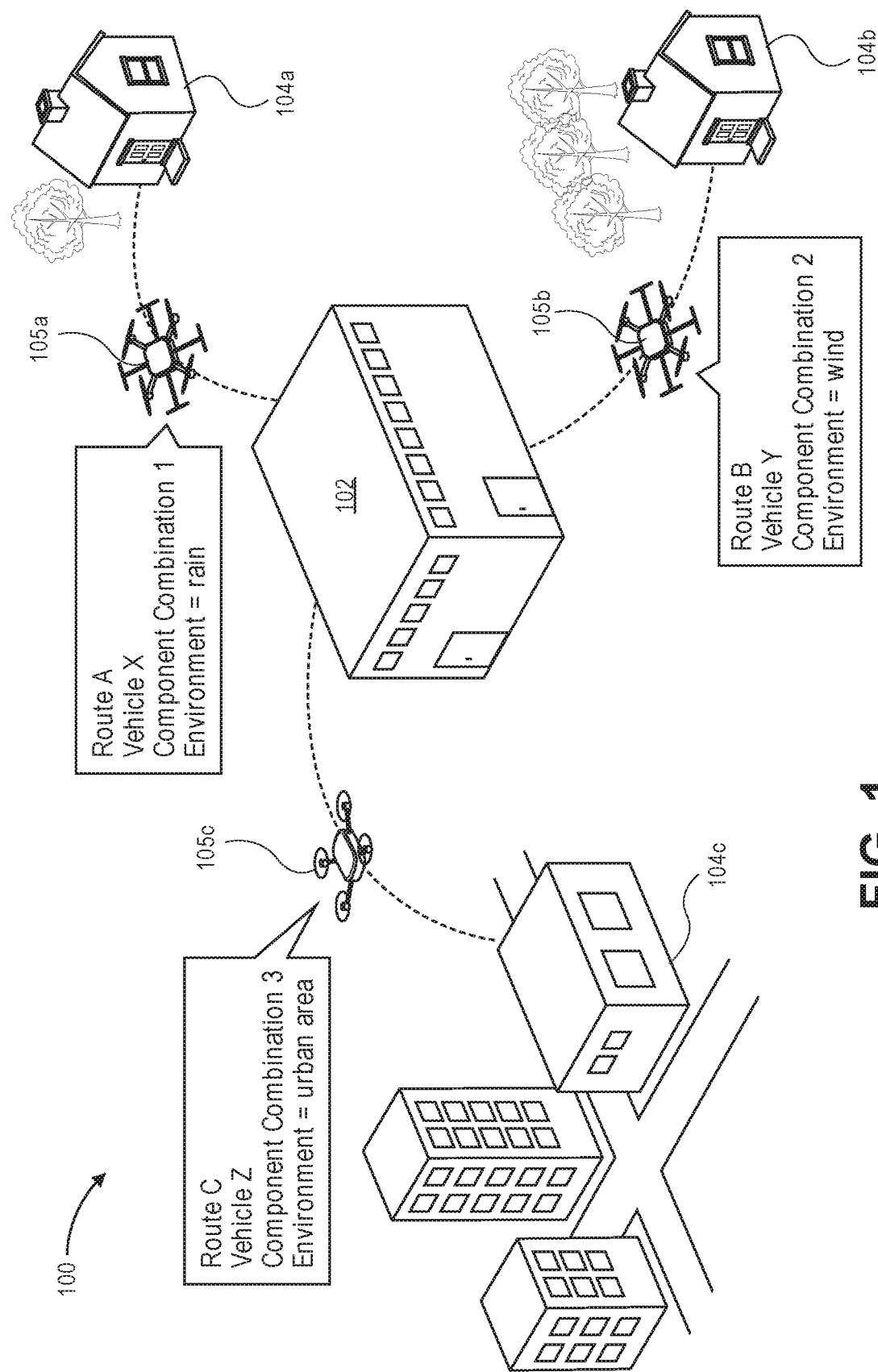
FIG. 1 is a schematic diagram of an example environment associated with a plurality of configurations of aerial vehicles, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods for pre-flight fabrication and/or assembly of aerial vehicles, such as automated aerial vehicles, are described herein. For example, upon determination of a need for an aerial vehicle, such as receipt of an order for delivery of an item by an aerial vehicle from an origin, such as a warehouse or fulfillment center, to a location, such as a delivery destination, the systems and methods described herein may fabricate and/or assemble an aerial vehicle having a particular configuration intended to satisfy the need or request.

Continuing with the example of a delivery of an item from a warehouse to a delivery destination by an aerial vehicle, a route or at least a portion of a route to be followed by the aerial vehicle from the warehouse to the delivery destination may be determined. The route or a portion thereof may include one or more pathways, destinations, waypoints, altitudes, or one or more other aspects of a route. In addition, one or more route characteristics of the route may be determined. The route characteristics may include information related to distance, altitude, duration, desired efficiency, desired noise profile, desired flight profile, or other characteristics associated with the intended route.

Further, an environment associated with the intended route may also be determined. In addition, one or more environment characteristics of the route may be determined. The environment characteristics may include information related to weather, temperature, pressure, humidity, altitude, air density, air quality, wind, precipitation, or other characteristics associated with the intended route.

Using at least the route, route characteristics, environment, and/or environment characteristics as inputs, one or more simulations of one or more models may be performed to determine a particular configuration of an aerial vehicle for completing the delivery of the item to the delivery destination. Other inputs to the simulation(s) of the model(s) may include vehicle characteristics, available components, manufacturable components, optimization parameters, and/or other characteristics or parameters as described herein.

The simulation(s) of the model(s) may provide output(s) including rankings of various combinations of vehicle characteristics and components, as described herein. For example, if a desired optimization parameter is used as one of the inputs to the simulation(s) of the model(s), then the output(s) may include a ranking of various combinations of vehicle characteristics and components based at least in part on the desired optimization parameter. Alternatively, the output(s) of the simulation(s) of the model(s) may include rankings of various combinations of vehicle characteristics and components for each of various possible optimization parameters. The optimization parameters may include power efficiency, range, thrust, torque, noise, flight dynamics, or other parameters.

For example, a particular aerial vehicle to be used for the delivery of the item may be determined based at least in part on the simulation(s) of the model(s). In addition, one or more vehicle characteristics may be determined. The vehicle characteristics may include information related to type or category, size, weight, number of propellers, propeller location, propeller orientation, payload parameters, fixed wing parameters, or other characteristics associated with the vehicle. The type or category of aerial vehicle may include information related to a frame, configuration, size, shape, weight, or other type or category of aerial vehicle. The payload parameters may include information related to size, weight, weight distribution, or other parameters of the payload. The fixed wing parameters may include information related to material, shape, size, chord, span, thickness, surface features, or other parameters of the wing.

In addition, one or more components to be used in the particular configuration of the aerial vehicle for the delivery of the item may be determined based at least in part on the simulation(s) of the model(s). The components may include one or more propellers, one or more motors, one or more power supplies, one or more wings, one or more sensors, or other components of the particular configuration of the aerial vehicle. The propeller parameters may include information related to material, shape, size, chord, span, thickness, surface features, number of blades per propeller, or other parameters of the propellers. The motor parameters may include information related to core size, number of windings, constant velocity (Kv), torque, acceleration, weight, or other parameters of the motors. The power supply parameters may include information related to a number, type, density, voltage, capacity, weight, or other parameters of the power supply. The wing parameters may include information related to material, shape, size, chord, span, thickness, surface features, or other parameters of the wing. The sensor parameters may include information related to type, number, orientation, location, or other parameters of the sensors.

Based at least in part on the aerial vehicle, aerial vehicle characteristics, components, and/or component parameters, the particular configuration of the aerial vehicle may be fabricated, manufactured, and/or assembled for the delivery of the item from the warehouse to the delivery destination. For example, components available at the warehouse may be retrieved, components manufacturable at the warehouse may be fabricated, e.g., using a 3-D printer or other fabrication systems and processes, and the particular configuration of the aerial vehicle may be fabricated and/or assembled to deliver the item to the delivery destination.

After completion of the delivery of the item to the delivery destination, the particular configuration of the aerial vehicle may return to the warehouse, or another location. Upon return of the particular configuration of the aerial vehicle, various components of the particular configuration may be disassembled or removed from the aerial vehicle and returned to storage within the warehouse, thereby making such components available for assembly of other configurations of aerial vehicles based on the simulation(s) of the model(s) for subsequent requests or deliveries.

Although the example embodiments described herein refer primarily to aerial vehicle, such as automated aerial vehicles, the systems and methods for pre-operation fabrication and/or assembly of vehicles described herein may also apply to various other types of vehicles, including ground-based vehicles, automated ground-based vehicles, water-based vehicles, automated water-based vehicles, or any other types of vehicles having varying levels or degrees of automation. Likewise, in addition to the various vehicle and component configurations and parameters described herein, the other types of vehicles may have other corresponding components and component parameters, such as wheels, tires, suspension systems, or other components for ground-based vehicles.

FIG. 1 is a schematic diagram of an example environment 100 associated with a plurality of configurations of aerial vehicles, according to an implementation.

In the example environment 100, a facility 102 may be a warehouse, materials handling facility, sort facility, inventory management facility, wholesale or retail facility, or any other facility from which deliveries of items may be initiated to various locations, e.g., delivery destinations. The facility 102 may maintain a variety of items or products that may be leased, rented, borrowed, purchased, or otherwise provided to individuals or entities at various locations. Although the facility 102 is shown in FIG. 1 as a land-based building, the facility may also comprise a water-based facility on a ship, tanker, rig, or other water-based vehicle or facility, or an air-based facility supported by a dirigible or other airborne vehicle or facility. Further, although only a single facility 102 is shown in FIG. 1, the example environment may include multiple facilities of various sizes and having various types of items or products. Moreover, in addition to deliveries of items to delivery destinations, the tasks or operations to be completed by particular aerial vehicle configurations may include returns or pickups of items from locations, or any other tasks or operations for which an aerial vehicle may be configured to traverse an intended route.

As shown in FIG. 1, a delivery of an item to location 104a has been requested. In response to receiving the request, a route, e.g., Route A, and an environment, e.g., rain, associated with the route may be determined. The route may be the shortest possible route between the facility 102 and the location 104a. Alternatively, the route may follow various other paths from the facility 102 to the location 104a, for example, to avoid highly populated areas, to comply with airspace restrictions or regulations, or for various other reasons. The route or a portion thereof may include one or more pathways, destinations, waypoints, altitudes, or one or more other aspects of a route. The selected route may have various route characteristics such as distance, altitude, duration, desired efficiency, desired noise profile, desired flight profile, or other characteristics. The environment associated with the selected route may include various environment characteristics such as weather, temperature, pressure, humidity, altitude, air density, air quality, wind, precipitation, or other characteristics.

Based at least in part on the route, e.g., Route A, and the environment, e.g., rain, one or more simulations of one or more models may be performed to determine a particular configuration 105a for an aerial vehicle for the delivery of the item to the location 104a. In addition, the determination of the particular configuration 105a may be further based on a selected optimization parameter for the delivery, which optimization parameters may include power efficiency, range, thrust, torque, noise, flight dynamics, or other parameters. In this particular example, the particular configuration 105a may be selected to optimize for thrust based at least in part on characteristics of the route and the environment, e.g., rain.

For example, as shown in FIG. 1, a particular vehicle, e.g., Vehicle X, may be selected, which may have particular vehicle characteristics such as type or category, size, weight, number of propellers, propeller location, propeller orientation, payload parameters, fixed wing parameters, or other characteristics. In addition, a particular combination of components, e.g., Component Combination 1, may be selected, which may have particular components such as one or more propellers, one or more motors, one or more power supplies, one or more wings, one or more sensors, or other components. For example, the propeller parameters may include material, shape, size, chord, span, thickness, surface features, number of blades per propeller, or other parameters, the motor parameters may include core size, number of windings, constant velocity (Kv), torque, acceleration, weight, or other parameters, the power supply parameters may include a number, type, density, voltage, capacity, weight, or other parameters, the wing parameters may include material, shape, size, chord, span, thickness, surface features, or other parameters, and the sensor parameters may include type, number, orientation, location, or other parameters of the sensors.

Accordingly, based at least in part on the route, environment, and selected optimization parameter, a particular configuration 105a of an aerial vehicle, e.g., Vehicle X having Component Combination 1, may be fabricated and/or assembled to complete the delivery of the item to location 104a.

In similar manner, as shown in FIG. 1, a delivery of an item to location 104b has also been requested. In response to receiving the request, a route, e.g., Route B, and an environment, e.g., wind, associated with the route may be determined. The route may be the shortest possible route between the facility 102 and the location 104b. Alternatively, the route may follow various other paths from the facility 102 to the location 104b, for example, to avoid highly populated areas, to comply with airspace restrictions or regulations, or for various other reasons. The route or a portion thereof may include one or more pathways, destinations, waypoints, altitudes, or one or more other aspects of a route. The selected route may have various route characteristics as described herein, and the environment associated with the selected route may include various environment characteristics as described herein.

Based at least in part on the route, e.g., Route B, and the environment, e.g., wind, one or more simulations of one or more models may be performed to determine a particular configuration 105b for an aerial vehicle for the delivery of the item to the location 104b. In addition, the determination of the particular configuration 105b may be further based on a selected optimization parameter for the delivery, which optimization parameters may include power efficiency, range, thrust, torque, noise, flight dynamics, or other parameters. In this particular example, the particular configuration 105b may be selected to optimize for flight dynamics based at least in part on characteristics of the route and the environment, e.g., wind.

For example, as shown in FIG. 1, a particular vehicle, e.g., Vehicle Y, may be selected, which may have particular vehicle characteristics as described herein. In addition, a particular combination of components, e.g., Component Combination 2, may be selected, which may have particular components such as one or more propellers, one or more motors, one or more power supplies, one or more wings, one or more sensors, or other components, and associated component parameters as described herein.

Accordingly, based at least in part on the route, environment, and selected optimization parameter, a particular configuration 105b of an aerial vehicle, e.g., Vehicle Y having Component Combination 2, may be fabricated and/or assembled to complete the delivery of the item to location 104b.

Likewise, as shown in FIG. 1, a delivery of an item to location 104c has also been requested. In response to receiving the request, a route, e.g., Route C, and an environment, e.g., urban area, associated with the route may be determined. The route may be the shortest possible route between the facility 102 and the location 104c. Alternatively, the route may follow various other paths from the facility 102 to the location 104c, for example, to avoid highly populated areas, to comply with airspace restrictions or regulations, or for various other reasons. The route or a portion thereof may include one or more pathways, destinations, waypoints, altitudes, or one or more other aspects of a route. The selected route may have various route characteristics as described herein, and the environment associated with the selected route may include various environment characteristics as described herein.

Based at least in part on the route, e.g., Route C, and the environment, e.g., urban area, one or more simulations of one or more models may be performed to determine a particular configuration 105c for an aerial vehicle for the delivery of the item to the location 104c. In addition, the determination of the particular configuration 105c may be further based on a selected optimization parameter for the delivery, which optimization parameters may include power efficiency, range, thrust, torque, noise, flight dynamics, or other parameters. In this particular example, the particular configuration 105c may be selected to optimize for noise based at least in part on characteristics of the route and the environment, e.g., urban area.

For example, as shown in FIG. 1, a particular vehicle, e.g., Vehicle Z, may be selected, which may have particular vehicle characteristics as described herein. In addition, a particular combination of components, e.g., Component Combination 3, may be selected, which may have particular components such as one or more propellers, one or more motors, one or more power supplies, one or more wings, one or more sensors, or other components, and associated component parameters as described herein.

Accordingly, based at least in part on the route, environment, and selected optimization parameter, a particular configuration 105c of an aerial vehicle, e.g., Vehicle Z having Component Combination 3, may be fabricated and/or assembled to complete the delivery of the item to location 104c.

Although FIG. 1 illustrates only three different example configurations of aerial vehicles for three different routes having associated environments based on three selected optimization parameters, any other number or combination of configurations, routes, environments, and/or optimization parameters may be present within this or other example environments in which a plurality of configurations of aerial vehicles may be fabricated and/or assembled to complete various tasks or operations.

Figure 2:
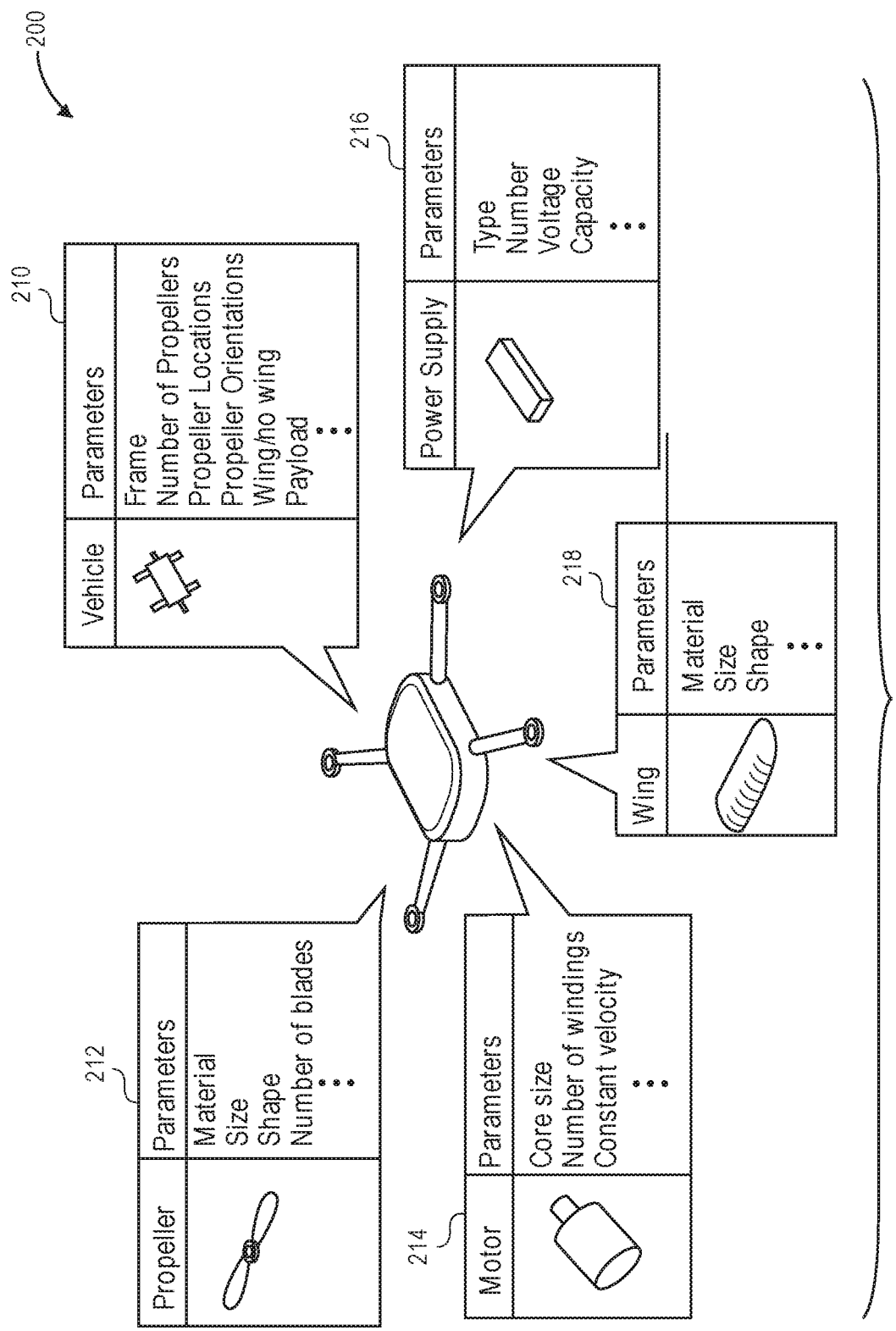
FIG. 2 is a schematic diagram of an example embodiment of a plurality of configurations of aerial vehicles, according to an implementation.

FIG. 2 is a schematic diagram of an example embodiment 200 of a plurality of configurations of aerial vehicles, according to an implementation. An aerial vehicle 205 may be fabricated and/or assembled to complete an intended task or operation, e.g., delivery of an item to a delivery destination, with various vehicle characteristics and component combinations.

The vehicle characteristics or parameters 210 may include various aspects of an aerial vehicle design. For example, the vehicle parameters 210 may include a type or category, size, weight, number of propellers, propeller location, propeller orientation, payload parameters, fixed wing parameters, or other parameters. A particular frame for an aerial vehicle may define parameters related to one or more of a type or category, size, weight, number of propellers, propeller location, propeller orientation, payload parameters, fixed wing parameters, or other parameters. Alternatively, a particular frame may include modular components to decouple various parameters such as size, weight, number of propellers, propeller location, propeller orientation, payload parameters, fixed wing parameters, or other parameters from a selection of a particular frame.

The type or category of the vehicle may also relate to vertical takeoff and landing (VTOL) vehicles, horizontal flight vehicles, or combinations thereof. The size of the vehicle may also include width, length, height, radial length, thickness, or other parameters. The weight of the vehicle may also include materials, material density, material thickness, weight distribution, center of mass, or other parameters. The payload parameters may also include size, weight, weight distribution, or other parameters of the payload. The fixed wing parameters may also include material, shape, size, chord, span, thickness, surface features, or other parameters of the wing.

The propeller parameters 212 may include various aspects of a propeller design. For example, the propeller parameters 212 may include material, shape, size, chord, span, thickness, pitch, surface features, number of blades per propeller, or other parameters of the propellers. The material of a propeller may include various core materials, e.g., foam, plastics, composites, or combinations thereof, and various exterior materials, e.g., carbon fiber, polyetherketoneketone (PEKK), plastics, composites, nylon-reinforced materials, or combinations thereof. The shape and/or size of a propeller may include various airfoil shapes and sizes. The surface features of a propeller may include various protrusions, indentations, or other materials included on various surfaces or edges.

The motor parameters 214 may include various aspects of a motor design. For example, the motor parameters 214 may include core size, number of windings, constant velocity (Kv), torque, acceleration, weight, or other parameters of the motors. The constant velocity (Kv) of a motor may correspond to a number of revolutions per minute (rpm) that the motor turns when 1V is applied with no load.

Although the particular configurations of the aerial vehicles are described herein with respect to various combinations of propellers and motors, any other types of propulsion mechanisms and their associated parameters may be used in combination with or in place of propellers and motors. For example, other types of propulsion mechanisms may include fans, jets, turbojets, turbo fans, jet engines, electric jets, or combinations thereof.

The power supply parameters 216 may include various aspects of a power supply design. For example, the power supply parameters 216 may include a number, type, density, voltage, capacity, weight, or other parameters of the power supply. For example, the type of power supply may include various types of electrochemical cells such as lithium ion (Li-ion, LiPo, LIP, Li-poly or others), nickel metal hydride (NiMH), or other cell types. In addition, although the particular configurations of the aerial vehicles are described herein with respect to various types of batteries, any other types of power supplies and their associated parameters may be used in combination with or in place of batteries. For example, other types of power supplies may include solar cells, liquid or gaseous fuels, fuel cells, super capacitors, alternative power generation sources, or combinations thereof.

The wing parameters 218 may include various aspects of a wing design. For example, the wing parameters 218 may include material, shape, size, chord, span, thickness, surface features, or other parameters of the wing. The material of a wing may include various core materials, e.g., foam, plastics, composites, or combinations thereof, and various exterior materials, e.g., carbon fiber, polyetherketoneketone (PEKK), plastics, composites, nylon-reinforced materials, or combinations thereof. The shape and/or size of a wing may include various airfoil shapes and sizes. The surface features of a wing may include various protrusions, indentations, or other materials included on various surfaces or edges.

The sensor parameters may include various aspects of a sensor design. For example, the sensor parameters may include type, number, orientation, location, or other parameters of the sensors. The type of sensors may include accelerometers, gyroscopes, inertial sensors, pressure sensors, humidity sensors, temperature sensors, weather sensors, imaging sensors, infrared sensors, radar sensors, LIDAR sensors, time of flight sensors, audio sensors, or any other types of sensors. The orientation of sensors may include a field of view, operational direction, operational range, or other aspects related to orientations of the sensors. The location of sensors may include mounting positions, attachment methods, or other aspects related to locations of the sensors.

FIG. 3 is a table of an example simulation output 300 associated with a plurality of configurations of aerial vehicles, according to an implementation.

One or more simulations may be performed using one or more models in order to determine or select a particular configuration from a plurality of configurations of aerial vehicles. The inputs 320 to the one or more models may include at least an intended route and associated route characteristics for a requested task or operation of an aerial vehicle. As described herein, the route or a portion thereof may include one or more pathways, destinations, waypoints, altitudes, or one or more other aspects of a route, and the route may include various route characteristics including distance, altitude, duration, desired efficiency, desired noise profile, desired flight profile, or other characteristics. The desired efficiency may relate to fuel or energy efficiency, optimal or desired operating ranges of motors, propellers, or other propulsion mechanisms, or other factors. The desired noise profile may relate to acceptable levels of noise emitted by the motors, propellers, or other propulsion mechanisms during various portions of the route. For example, an acceptable level of noise for high altitude portions of the route over unpopulated areas, e.g., over uninhabited natural areas, may be higher than an acceptable level of noise for low altitude portions of the route over highly populated areas, e.g., within a facility, in an urban area, or at a delivery destination. The desired flight profile may relate to intended operations of the aerial vehicle during various portions of the route, such as speed, altitude, an amount of time spent in a VTOL orientation, an amount of time spent in a horizontal flight orientation, or other parameters.

The inputs 320 to the one or more models may also include an environment and associated environment characteristics for the intended route. As described herein, the environment may include various environment characteristics including weather, temperature, pressure, humidity, altitude, air density, air quality, wind, precipitation, population density, type of environment, or other characteristics.

In addition, the inputs 320 to the one or more models may also include one or more vehicles and associated vehicle characteristics. For example, there may be a limited set of available vehicles having associated vehicle characteristics, such that simulations of models that include other unavailable vehicles having associated vehicle characteristics need not be performed. Likewise, parameters related to a payload or a fixed wing associated with a vehicle may also comprise inputs to the one or more models.

Further, the inputs 320 to the one or more models may also include information related to components and associated component parameters. For example, there may be a limited set of available components having associated component parameters. In addition, if the facility includes capabilities to manufacture or fabricate one or more of a plurality of components of aerial vehicles, such capabilities may also be provided as inputs to the one or more models.

Moreover, the inputs 320 to the one or more models may also include information related to certification of vehicles, vehicle characteristics, components, component parameters, or combinations thereof. For example, various vehicles, vehicle characteristics, components, component parameters, or combinations thereof may be certified for flight operations, e.g., by a government entity or regulation agency, and such information may be provided as additional inputs to the models such that the output of the simulations provides rankings of various configurations of aerial vehicles that are already certified for flight operations.

The one or more models may be programmed or configured to execute on one or more processors. The models may receive one or more inputs as described herein and simulate operations of a plurality of configurations of aerial vehicles. For example, using at least an intended route as an input, simulations of a plurality of configurations of aerial vehicles may be performed using the models. The output of the simulations of the models may include rankings of one or more configurations of aerial vehicles for one or more optimization parameters or factors 330. As described herein, the optimization factors 330 may include power efficiency, range, thrust, torque, noise, flight dynamics, or other parameters. Alternatively, if a desired optimization factor 330 is used as one of the inputs to the models, then the output may include a ranking of one or more configurations of aerial vehicles based at least in part on the desired optimization parameter.

As shown in FIG. 3, the output of the simulations of the models may include rankings 340 of a plurality of configurations of aerial vehicles for each optimization parameter 330. For example, the ranking 340a associated with an optimization parameter 330 for efficiency identifies configuration 1 (Config1), configuration 2 (Config2), and configuration 3 (Config3) as the top three configurations optimized for efficiency based at least in part on the intended route, and any other inputs to the models. The configurations may include any combination of vehicles, vehicle characteristics, components, and component parameters as described herein. Likewise, the rankings 340b-340n associated with respective optimization parameters 330 identify various configurations optimized for each respective optimization parameter based at least in part on the intended route, and any other inputs to the models.

Based at least in part on the output of the simulations of the models, a particular configuration of an aerial vehicle may be selected to perform a task or operation, e.g., delivery of an item to a delivery destination. In addition, if multiple simulations of the models are performed for multiple tasks or operations to be completed within a particular timeframe, the selection of a particular configuration of an aerial vehicle for one task or operation may affect, or be affected by, selections of one or more other particular configurations of aerial vehicles for other tasks or operations. For example, if two different configurations of aerial vehicles that are optimal for their respective intended routes nonetheless include one or more of the same vehicles, vehicle characteristics, components, or component characteristics that are in limited supply, the selection of one or more of the particular configurations may be altered, changed, or modified in order to be able to complete both tasks or operations on time, or according to any other completion criteria. As one example, instead of using a highest ranking configuration of an aerial vehicle for a first task, a second highest ranking configuration of an aerial vehicle may instead be used for the first task, in order to allow one or more other configurations of aerial vehicles to be used to complete one or more other tasks, e.g., within overlapping timeframes.

Although the example embodiments described herein refer primarily to simulations of models in order to select a particular configuration of an aerial vehicle for an operation based on various factors, other methods and processes for determining or selecting a particular configuration of an aerial vehicle for an operation may also be used, in combination with or in place of simulations of models. For example, other methods of analyzing one or more possible configurations of an aerial vehicle may include providing one or more inputs to various algorithms, equations, and/or models to analyze the performance of various possible configurations with respect to one or more optimization parameters, and the outputs of such algorithms, equations, and/or models may further be compared, processed, and/or analyzed to determine or select a particular configuration for an operation. Accordingly, some of the potential analysis methods may proceed without performing a full or partial simulation of one or more models.

Figure 4:
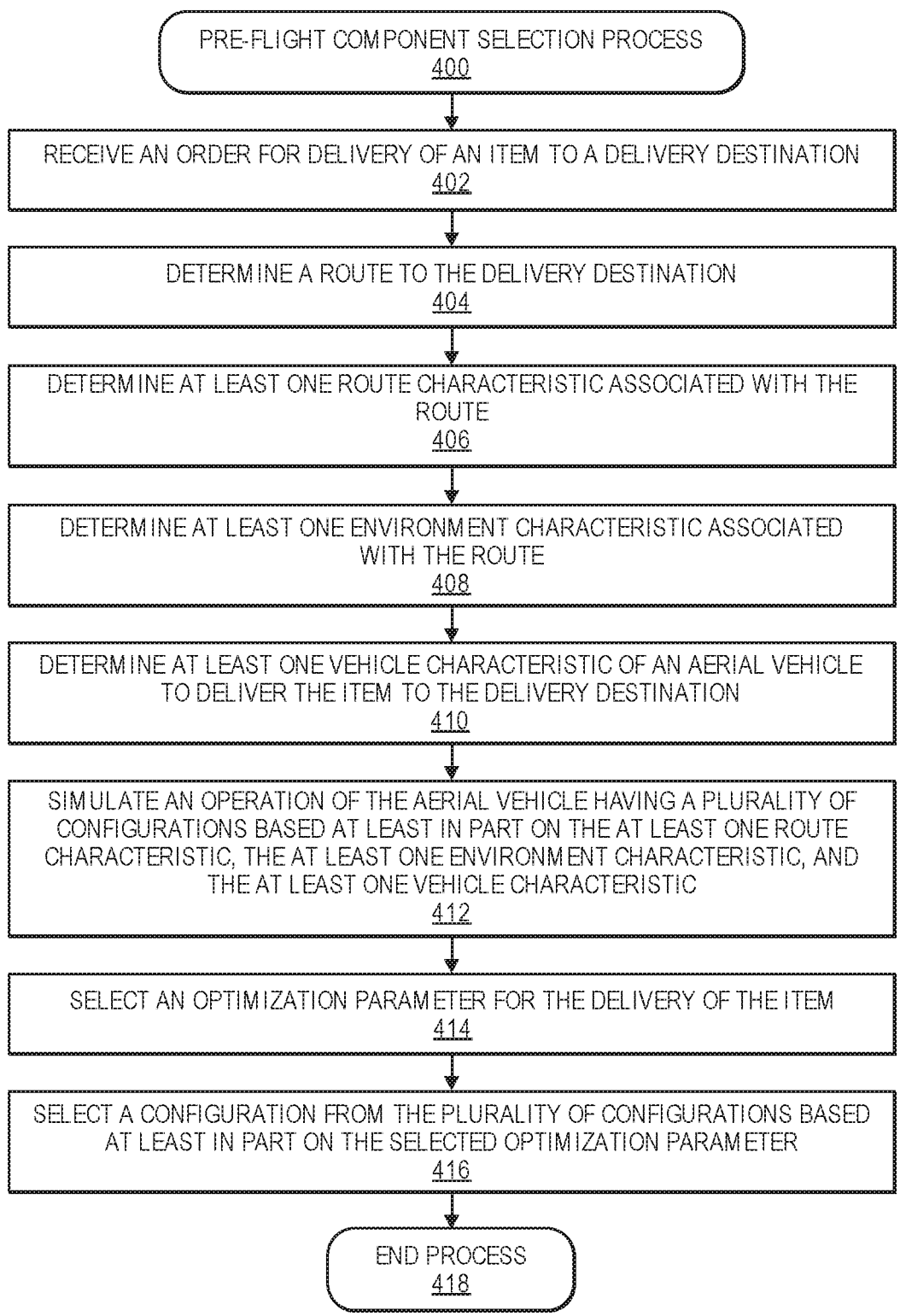
FIG. 4 is a flow diagram illustrating an example pre-flight component selection process, according to an implementation.

FIG. 4 is a flow diagram illustrating an example pre-flight component selection process 400, according to an implementation.

The process 400 may begin by receiving an order for delivery of an item to a delivery destination, as at 402. For example, the order may identify an item available from a facility that is to be delivered to the delivery destination via an aerial vehicle. Alternatively, instead of an order for delivery of an item, the request may comprise any other task or operation to be completed by an aerial vehicle.

The process 400 may proceed by determining a route to the delivery destination, as at 404. For example, the route may be selected from a plurality of possible routes from an origin, e.g., a facility, to a location, e.g., the delivery destination, based on various factors, such as to avoid highly populated areas, to comply with airspace restrictions or regulations, or various other factors, as described herein. The route or a portion thereof may include one or more pathways, destinations, waypoints, altitudes, or one or more other aspects of a route. The process 400 may then continue by determining at least one route characteristic associated with the route, as at 406. For example, the route may include various route characteristics such as distance, altitude, duration, desired efficiency, desired noise profile, desired flight profile, or other characteristics, as described herein.

Then, the process 400 may continue by determining at least one environment characteristic associated with the route, as at 408. For example, various environment characteristics may be associated with the route such as weather, temperature, pressure, humidity, altitude, air density, air quality, wind, precipitation, population density, type of environment, or other characteristics.

The process 400 may then proceed by determining at least one vehicle characteristic of an aerial vehicle to deliver the item to the delivery destination, as at 410. For example, an aerial vehicle may include various vehicle characteristics such as type or category, size, weight, number of propellers, propeller location, propeller orientation, payload parameters, fixed wing parameters, or other characteristics.

Then, the process 400 may continue by simulating an operation of a plurality of configurations of aerial vehicles based at least in part on the at least one route characteristic, the at least one environment characteristic, and the at least one vehicle characteristic, as at 412. For example, the simulations of one or more models may be performed using at least the route and/or at least one route characteristic associated with the task or operation as inputs to the models. As described herein, further inputs may be provided to the models in order to perform the simulations, including at least one environment characteristic, at least one vehicle characteristic, available components, manufacturable components, or other inputs. For example, if only a limited set of vehicles, vehicle characteristics, components, and/or component parameters are available for various configurations of aerial vehicles, such limited sets may be provided as inputs to the models in order to perform simulations only with respect to available and possible combinations of aerial vehicle configurations. Alternatively, if a facility includes capabilities to retrieve and/or fabricate a virtually unlimited set of vehicles, vehicle characteristics, components, and/or component parameters, then simulations of the models may be performed without such additional inputs.

The process 400 may then continue by selecting an optimization parameter for the delivery of the item, as at 414. For example, the optimization parameter may include one or more of power efficiency, range, thrust, torque, noise, flight dynamics, or other parameters. The output of the simulations of the models may provide rankings of various configurations of aerial vehicles for one or more optimization parameters.

The process 400 may proceed by selecting a configuration from the plurality of configurations of aerial vehicles based at least in part on the selected optimization parameter, as at 416. For example, in some embodiments, the simulations of the models may provide output that includes rankings of various configurations of aerial vehicles for each respective optimization parameter. Then, a particular configuration may be selected for completion of the task or operation based on the desired optimization parameter. In other embodiments, an optimization parameter may be selected and used as an additional input to the models such that the output of the simulations provides rankings of various configurations of aerial vehicles for the selected optimization parameter. Then, a particular configuration may be selected for completion of the task or operation. The process 400 may then end, as at 418.

Figure 5:
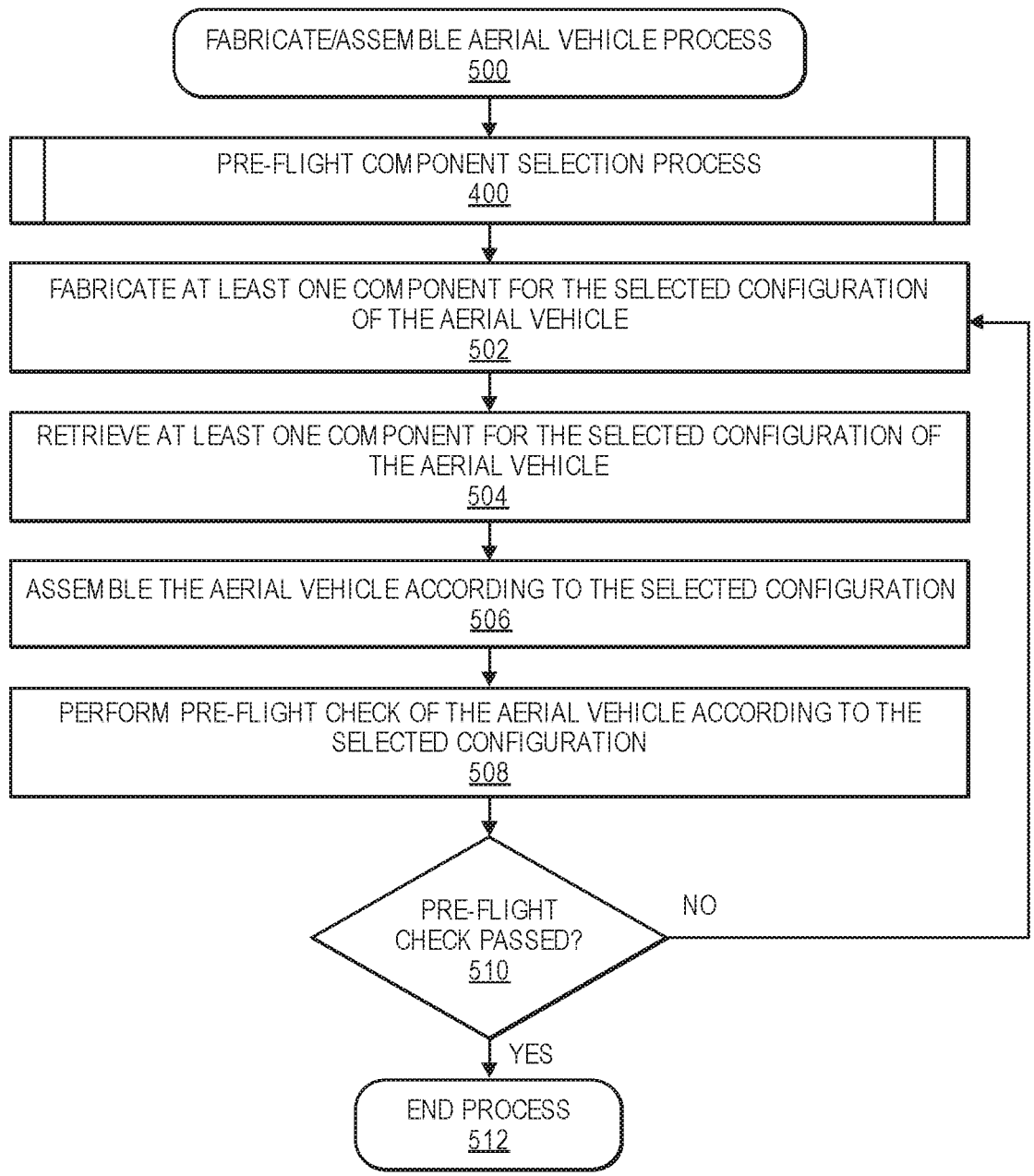
FIG. 5 is a flow diagram illustrating an example aerial vehicle fabrication and/or assembly process, according to an implementation.

FIG. 5 is a flow diagram illustrating an example aerial vehicle fabrication and/or assembly process 500, according to an implementation.

The process 500 may begin by performing the pre-flight component selection process 400, as described herein. The pre-flight component selection process 400 may result in a selection of a particular configuration of an aerial vehicle for a task or operation, in which the particular configuration is optimized for a selected optimization parameter and includes a vehicle, at least one vehicle characteristic, one or more components, and at least one component parameter.

The process 500 may proceed by fabricating at least one component for the selected configuration of the aerial vehicle, as at 502. For example, if the facility includes capabilities to manufacture or fabricate one or more vehicles or components, such as 3-D printers, injection molding machinery, metalworking machinery, woodworking machinery, or any other manufacturing or fabrication machinery or tools, then one or more vehicles or components having various vehicle characteristics and component parameters may be fabricated for the selected configuration.

The process 500 may then continue by retrieving at least one component for the selected configuration of the aerial vehicle, as at 504. For example, the facility may maintain and store one or more vehicles or components in inventory, and the one or more vehicles or components having various vehicle characteristics and component parameters may be retrieved from storage for the selected configuration.

Then, the process 500 may proceed by assembling the aerial vehicle according to the selected configuration, as at 506. For example, using the at least one fabricated component and/or the at least one retrieved component, the selected configuration for the aerial vehicle may be assembled, e.g., using one or more manual or automatic processes.

The process 500 may then continue by performing a pre-flight check of the selected configuration of the aerial vehicle, as at 508. For example, the pre-flight check may include a visual confirmation that the selected configuration was correctly assembled with the correct components, e.g., by manual check processes or by automated check processes using scanning technologies, radiofrequency identification (RFID) technologies, or image capture and recognition technologies. In addition, the pre-flight check may also include a power-up, e.g., on a test bed or bench, of one or more motors, propellers, propulsion mechanisms, controllers, processors, or other components of the selected configuration to confirm their proper operation. Further, the pre-flight check may also include a short test flight of the selected configuration as a further confirmation of proper operation.

Then, the process 500 may proceed to determine whether the pre-flight check has passed all requirements, as at 510. If one or more aspects of the pre-flight check did not pass the requirements, then the process 500 may return to one or more of the fabrication, retrieval or assembly steps to correct any errors or faults in the selected configuration. If, however, the pre-flight check passed all requirements, then the process 500 may end, as at 512.

Figure 6:
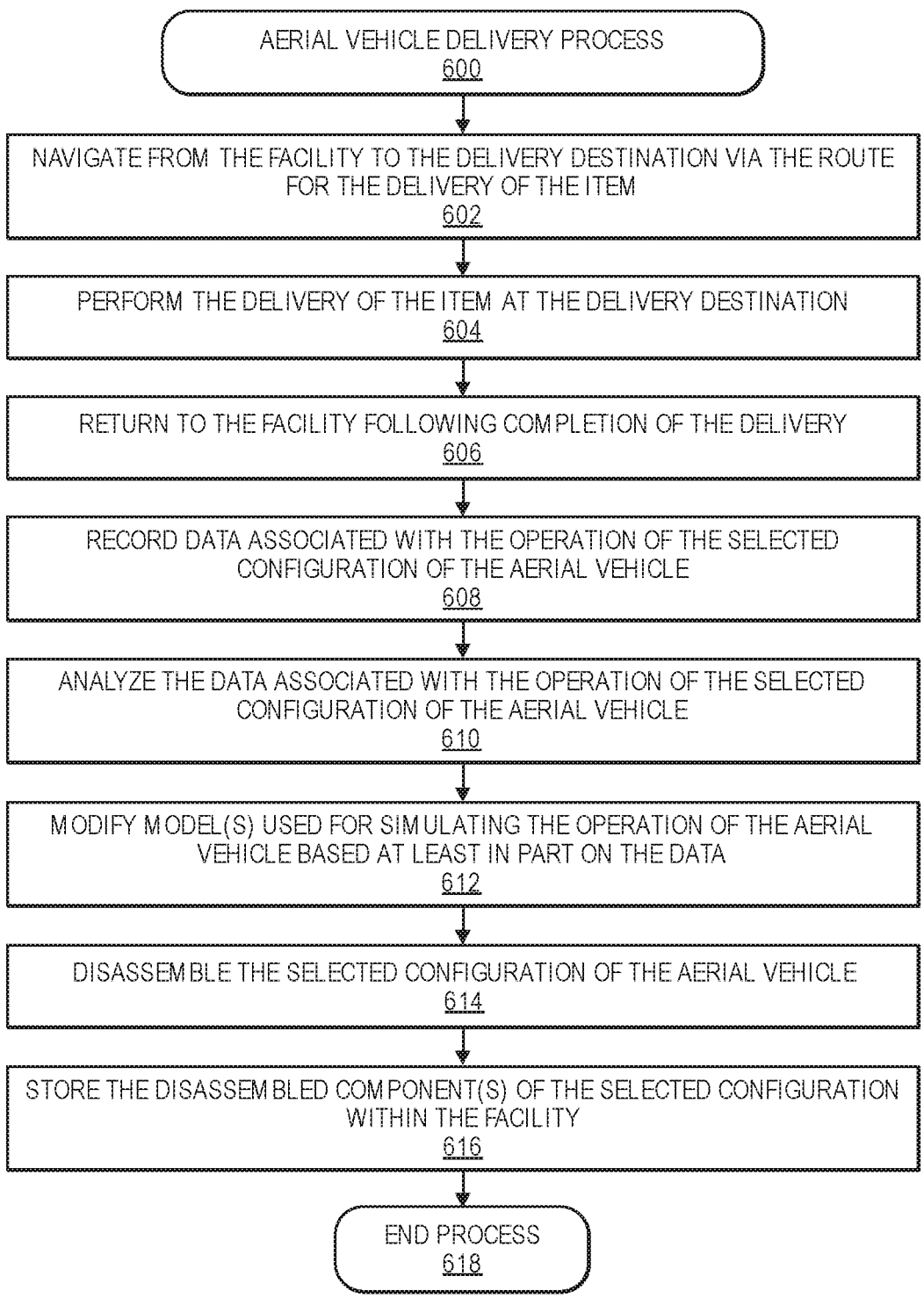
FIG. 6 is a flow diagram illustrating an example aerial vehicle delivery process, according to an implementation.

FIG. 6 is a flow diagram illustrating an example aerial vehicle delivery process 600, according to an implementation.

The process 600 may begin by causing navigation of the selected configuration of the aerial vehicle from the facility to the delivery destination via the route, as at 602. For example, the selected configuration of the aerial vehicle may depart from an origin, e.g., a facility, and navigate to a location, e.g., a delivery destination, to complete a task or operation, e.g., delivery of an item. The process 600 may continue by causing delivery of the item at the delivery destination, as at 604. For example, upon arriving at the location, the selected configuration of the aerial vehicle may complete the task or operation, e.g., delivery of the item at the delivery destination. Then, the process 600 may proceed by causing return of the selected configuration of the aerial vehicle to the facility, as at 606. For example, after completion of the task or operation, e.g., delivery of the item, the selected configuration of the aerial vehicle may navigate back to an origin or other location, e.g., the facility.

During all or a portion of the operation of the selected configuration of the aerial vehicle, e.g., during navigation to a destination, operations at the destination, and/or during navigation back to an origin, data associated with the operation of the selected configuration may be recorded, as at 608. The recorded data may relate to operations of the vehicle and/or one or more components. In addition, the recorded data may also relate to the route, the environment associated with the route, or any other aspects related to the operation of the selected configuration. The data may be recorded and stored locally on the aerial vehicle, and/or the data may be transmitted from the aerial vehicle to a remote or central server.

Upon return of the selected configuration of the aerial vehicle to the origin or other location, e.g., the facility, the recorded data may be transmitted or uploaded to a remote or central server, and the recorded data may be analyzed, as at 610. The data analysis may include a comparison of the recorded data of operation of the selected configuration with the predicted or simulated operations of the selected configuration as provided by the simulations of the models.

Based at least in part on the data analysis, the one or more models used to simulate the operations of the selected configuration may be modified or updated, as at 612. By such modification or updates, the one or more models may be continually improved or updated to more accurately predict or simulate actual operations of various configurations of aerial vehicles.

The process 600 may also include disassembling the selected configuration of the aerial vehicle, as at 614, and storing disassembled components of the selected configuration, as at 616. For example, upon return of the selected configuration of the aerial vehicle to the origin or other location, e.g., the facility, one or more components of the selected configuration may be removed or disassembled and placed in storage within the facility. In addition, a vehicle, e.g., a frame, fuselage, or body of an aerial vehicle, may also be placed in storage within the facility. By disassembling and storing vehicles and components, all such vehicles and components may be available for subsequent or future tasks and operations and provide increased flexibility with respect to the available configurations of aerial vehicles that may be retrieved and assembled at any time. The process may then end, as at 618.

In other embodiments, one or more components may also be deprecated, discarded, or recycled, e.g., if the component was damaged, if the component was intended for only a single use, if the component did not perform as predicted or simulated, if the facility does not have capacity to store additional components, or any other reasons.

In further embodiments, no components or only a portion of the components of a selected configuration may be disassembled, such that a fully or partially configured aerial vehicle may be maintained within the facility. Such fully or partially configured aerial vehicles may be advantageously maintained, e.g., if future tasks or operations are likely to require similar configurations. For example, during peak operational or delivery times, deliveries of similar items to closely clustered locations under similar conditions may be anticipated as requiring several aerial vehicles of the same or similar configurations. In such scenarios, it may be advantageous to maintain fully or partially configured aerial vehicles to quickly satisfy the anticipated demand.

Figure 7:
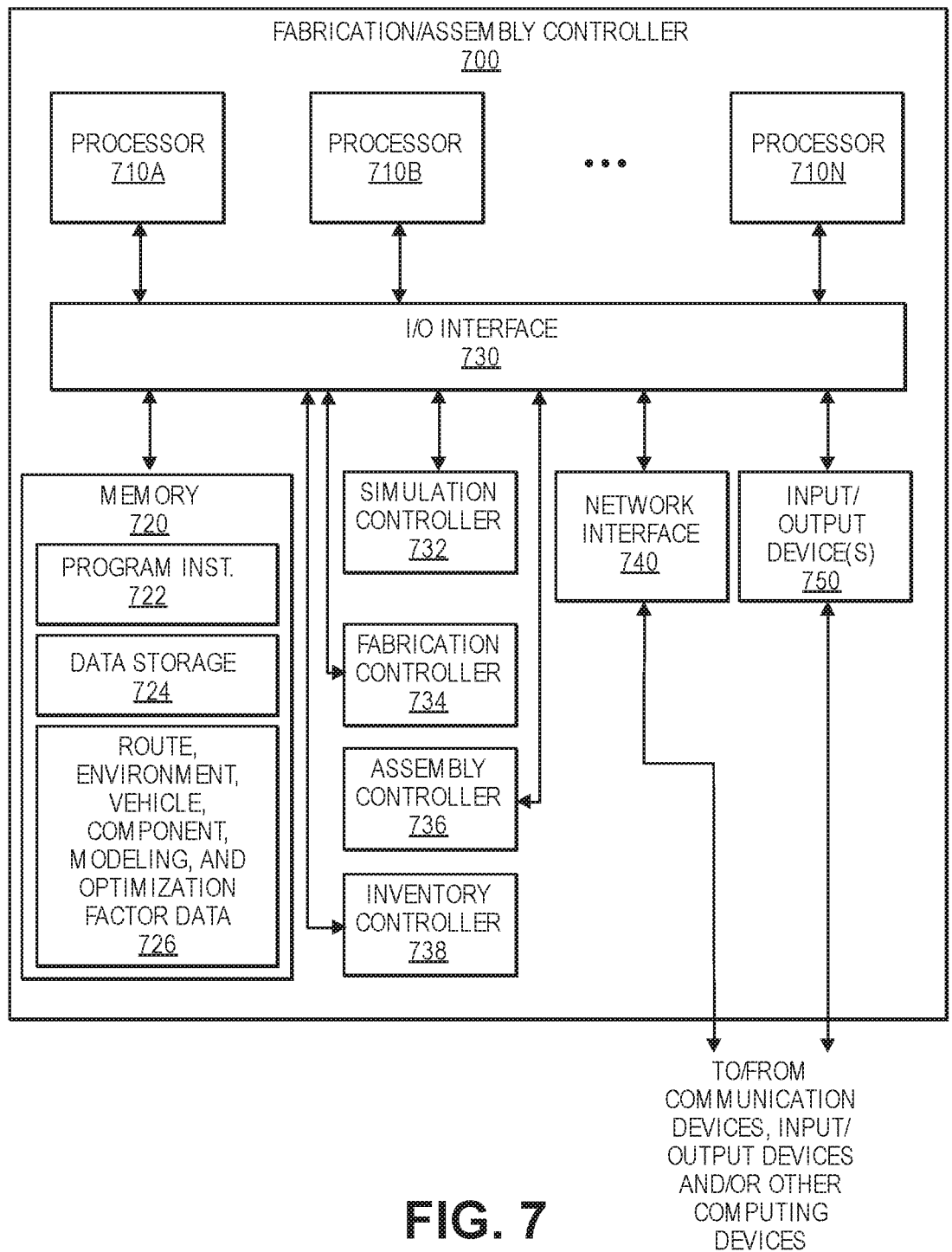
FIG. 7 is a block diagram illustrating various components of a pre-flight aerial vehicle fabrication/assembly controller, according to an implementation.

FIG. 7 is a block diagram illustrating various components of a pre-flight aerial vehicle fabrication/assembly controller 700, according to an implementation. In various examples, the block diagram may be illustrative of one or more aspects of the aerial vehicle fabrication/assembly controller 700 that may be used to implement the various systems and processes discussed above. In the illustrated implementation, the aerial vehicle fabrication/assembly controller 700 includes one or more processors 710, coupled to a non-transitory computer readable storage medium 720 via an input/output (I/O) interface 730. The aerial vehicle fabrication/assembly controller 700 may also include a simulation controller 732, a fabrication controller 734, an assembly controller 736, and an inventory controller 738. The aerial vehicle fabrication/assembly controller 700 further includes a network interface 740, and one or more input/output devices 750.

In various implementations, the aerial vehicle fabrication/assembly controller 700 may be a uniprocessor system including one processor 710, or a multiprocessor system including several processors 710A-710N (e.g., two, four, eight, or another suitable number). The processor(s) 710 may be any suitable processor capable of executing instructions. For example, in various implementations, the processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 710 may commonly, but not necessarily, implement the same ISA.

The non-transitory computer readable storage medium 720 may be configured to store executable instructions, data, route, environment, vehicle, component, modeling, and optimization factor data, characteristics, or parameters, and/or other data items accessible by the processor(s) 710. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724 and route, environment, vehicle, component, modeling, and optimization factor data, characteristics, or parameters 726, respectively. In other implementations, program instructions, data and/or other data and characteristics may be received, sent or stored upon different types of computer-accessible media, such as non-transitory media, or on similar media separate from the non-transitory computer readable storage medium 720 or the aerial vehicle fabrication/assembly controller 700.

Generally speaking, a non-transitory, computer readable storage medium may include storage media or memory media such as magnetic or optical media, e.g., disk or CD/DVD-ROM, coupled to the aerial vehicle fabrication/assembly controller 700 via the I/O interface 730. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processor(s) 710, the non-transitory computer readable storage medium 720, and any peripheral devices, the network interface 740 or other peripheral interfaces, such as input/output devices 750. In some implementations, the I/O interface 730 may perform any necessary protocol, timing or other data transformations to convert data signals from one component (e.g., non-transitory computer readable storage medium 720) into a format suitable for use by another component (e.g., processor(s) 710). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer readable storage medium 720, may be incorporated directly into the processor(s) 710.

The simulation controller 732 may communicate with the processors 710, the non-transitory computer readable storage medium 720, the network interface 740, and/or any input/output devices 750. As described herein, the simulation controller 732 may control the simulations of operations of various configurations of aerial vehicles using one or more models and based on one or more inputs received and/or stored in memory, and may also provide the output from the simulations of the models to one or more processors (or one or more users) for selection of particular configurations.

The fabrication controller 734 may communicate with the processors 710, the non-transitory computer readable storage medium 720, the network interface 740, and/or any input/output devices 750. As described herein, the fabrication controller 734 may control the operations of various manufacturing or fabrication machinery or tools based on various selected configurations of aerial vehicles. For example, the fabrication controller 734 may instruct the fabrication of one or more vehicles having various vehicle characteristics and/or one or more components having various component parameters based on various selected configurations.

The assembly controller 736 may communicate with the processors 710, the non-transitory computer readable storage medium 720, the network interface 740, and/or any input/output devices 750. As described herein, the assembly controller 736 may control the operations of various assembly machinery or processes based on various selected configurations of aerial vehicles. For example, the assembly controller 736 may instruct the assembly of one or more vehicles having various vehicle characteristics and one or more components having various component parameters based on various selected configurations, and may also instruct the disassembly of one or more vehicles having various vehicle characteristics and one or more components having various component parameters upon completion of tasks or operations.

The inventory controller 738 may communicate with the processors 710, the non-transitory computer readable storage medium 720, the network interface 740, and/or any input/output devices 750. As described herein, the inventory controller 738 may control the retrieval, storage, and deprecation of various vehicles and/or components for various configurations of aerial vehicles within a facility. For example, the inventory controller 738 may instruct the retrieval of one or more components having various component parameters for assembly of various selected configurations, and may also instruct the storage or deprecation of one or more components having various component parameters upon disassembly from various selected configurations.

The network interface 740 may be configured to allow data to be exchanged between the aerial vehicle fabrication/assembly controller 700, other devices attached to a network, such as other computer systems, aerial vehicle control systems of aerial vehicles, and/or other aerial vehicle fabrication/assembly controllers of other facilities. For example, the network interface 740 may enable wireless communication between numerous aerial vehicle fabrication/assembly controllers, as well as between the aerial vehicle fabrication/assembly controller and various aerial vehicles, e.g., for the transmission and/or receipt of operational data related to selected configurations of aerial vehicles. In various implementations, the network interface 740 may support communication via wireless general data networks, such as a Wi-Fi network. For example, the network interface 740 may support communication via telecommunications networks such as cellular communication networks, satellite networks, and the like.

Input/output devices 750 may, in some implementations, include one or more displays, input devices, output devices, image capture devices, scanning devices, thermal sensors, infrared sensors, time of flight sensors, accelerometers, pressure sensors, weather sensors, other environment sensors, etc. Multiple input/output devices 750 may be present and controlled by the aerial vehicle fabrication/assembly controller 700. For example, one or more of these sensors may be utilized to assist in the simulation, modeling, fabrication, retrieval, assembly, inventory management, and/or pre-flight check processes, as well as simulated and/or actual operations of various configurations of the aerial vehicles.

As shown in FIG. 7, the memory may include program instructions 722 which may be configured to implement the example processes and/or sub-processes described above. The data storage 724 and the route, environment, vehicle, component, modeling, and optimization factor data, characteristics, or parameters 726 may include various data stores for maintaining data items that may be provided for determining routes and route characteristics, determining environment characteristics, determining vehicles and vehicle characteristics, determining components and component parameters, selecting optimization parameters, simulating operations of various configurations, fabricating vehicles or components, retrieving, storing, or deprecating vehicles or components, assembling or disassembling vehicles or components, performing pre-flight check processes, recording and analyzing actual operational data of various configurations, modifying models used for simulations, and/or other processes described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle fabrication/assembly controller 700 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle fabrication/assembly controller 700 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle fabrication/assembly controller 700. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle fabrication/assembly controller 700 may be transmitted to the aerial vehicle fabrication/assembly controller 700 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle fabrication/assembly controller configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method of assembling an automated aerial vehicle, comprising:
   receiving an order for delivery of an item to a delivery destination;
   determining a route for the delivery of the item to the delivery destination;
   determining at least one route characteristic associated with the route;
   determining at least one environment characteristic associated with the route to the delivery destination;
   determining at least one vehicle characteristic of an automated aerial vehicle to deliver the item to the delivery destination;
   selecting at least one optimization parameter for the delivery of the item;
   simulating an operation of the automated aerial vehicle having a plurality of propeller configurations based at least in part on the at least one route characteristic, the at least one environment characteristic, and the at least one vehicle characteristic, wherein the plurality of propeller configurations include a plurality of propellers having different respective propeller parameters;
   selecting a first propeller configuration of the plurality of propeller configurations based at least in part on the selected at least one optimization parameter;
   causing fabrication of the first propeller configuration for the automated aerial vehicle responsive to receiving the order for the delivery of the item; and
   causing assembly of the automated aerial vehicle having the first propeller configuration for the delivery of the item to the delivery destination responsive to receiving the order for the delivery of the item.

2. The method of claim 1, wherein the at least one route characteristic includes at least one of distance, altitude, desired efficiency, or desired noise level.

3. The method of claim 1, wherein the at least one environment characteristic includes at least one of temperature, pressure, humidity, altitude, air density, air quality, wind, or precipitation.

4. The method of claim 1, wherein the at least one vehicle characteristic includes at least one of size, weight, number of propellers, propeller location, propeller orientation, payload parameters, or fixed wing parameters.

5. The method of claim 1, wherein the at least one optimization parameter includes at least one of power efficiency, range, thrust, torque, noise, or flight dynamics.

6. The method of claim 1, wherein the propeller parameters include at least one of material, shape, size, chord, span, thickness, pitch, surface features, or number of blades per propeller.

7. A method of assembling an automated aerial vehicle, comprising:
  receiving an order for delivery of an item to a delivery destination;
  determining a route for the delivery of the item by the automated aerial vehicle;
  determining at a route characteristic, an environment characteristic, and a vehicle characteristic associated with the route to deliver the item to the delivery destination;
  simulating an operation of the automated aerial vehicle having a plurality of configurations based at least in part on the route characteristic, the environment characteristic, and the vehicle characteristic, wherein the plurality of configurations include at least one of a plurality of propellers, a plurality of motors, a plurality of power supplies, a plurality of sensors, or a plurality of vehicle configurations;
  selecting an optimization parameter for the delivery of the item to the delivery destination;
  selecting a first configuration of the plurality of configurations based at least in part on the selected optimization parameter; and
  at least one of causing fabrication or assembly of the first configuration for the automated aerial vehicle for the delivery of the item responsive to receiving the order for the delivery of the item.

8. The method of claim 7, wherein the route characteristic and the environment characteristic includes at least one of distance, altitude, desired efficiency, desired noise level, temperature, pressure, humidity, altitude, air density, air quality, wind, or precipitation associated with the route.

9. The method of claim 7, wherein the plurality of propellers include a plurality of different respective propeller parameters, the propeller parameters including at least one of material, shape, size, chord, span, thickness, pitch, surface features, or number of blades per propeller.

10. The method of claim 7, wherein the plurality of motors include a plurality of different respective motor parameters, the motor parameters including at least one of core size, number of windings, constant velocity (Kv), torque, acceleration, or weight.

11. The method of claim 7, wherein the plurality of power supplies include a plurality of different respective power supply parameters, the power supply parameters including at least one of a number, type, density, voltage, capacity, or weight.

12. The method of claim 7, wherein the plurality of vehicle configurations include a plurality of different respective vehicle parameters, the vehicle parameters including at least one of size, weight, number of propellers, propeller location, propeller orientation, payload parameters, or fixed wing parameters.

13. The method of claim 12, wherein the payload parameters include at least one of size, weight, or weight distribution, and wherein the fixed wing parameters include at least one of material, shape, size, chord, span, thickness, or surface features.

14. The method of claim 7, further comprising:
  determining an available set of the plurality of configurations having pre-fabricated components;
  wherein simulating the operation of the automated aerial vehicle comprises simulating the operation based at least in part on the available set of the plurality of configurations.

15. The method of claim 7, wherein causing fabrication of the first configuration comprises 3-D printing at least one of a propeller or a wing of the first configuration.

16. The method of claim 7, further comprising:
  determining that a second configuration of a second automated aerial vehicle for a second operation via a second route requires a component included in the first configuration;
  selecting a third configuration of the plurality of configurations for the automated aerial vehicle based at least in part on the selected optimization parameter, the third configuration being a next highest ranking configuration of the plurality of configurations for the automated aerial vehicle based at least in part on the selected optimization parameter; and
  at least one of causing fabrication or assembly of the third configuration for the automated aerial vehicle for the delivery of the item.

17. The method of claim 7, further comprising:
  receiving data associated with the delivery of the item of the first configuration for the automated aerial vehicle; and
  updating a model used for simulating the operation of the automated aerial vehicle having the plurality of configurations based at least in part on the data.

18. A system to assemble an automated aerial vehicle, comprising:
  under control of a computer processor in communication with a memory, the computer processor configured to at least:
  receive an order for delivery of an item to a delivery destination by the automated aerial vehicle;
  determine a route characteristic, an environment characteristic, and a vehicle characteristic associated with a route to perform the delivery of the item to the delivery destination;
  simulate an operation of a plurality of configurations for the automated aerial vehicle based at least in part on the route characteristic, the environment characteristic, and the vehicle characteristic of the route for the automated aerial vehicle, wherein the plurality of configurations include at least one of a plurality of propellers, a plurality of motors, a plurality of power supplies, a plurality of sensors, or a plurality of vehicle configurations;
  select a first configuration of the plurality of configurations for the automated aerial vehicle based at least in part on an optimization parameter;
  instruct a 3-D printer to fabricate at least one of a first propeller or a first wing included in the first configuration responsive to receiving the order for the delivery of the item by the automated aerial vehicle; and
  instruct assembly of the first configuration for the automated aerial vehicle including the at least one of the first propeller or the first wing responsive to receiving the order for the delivery of the item by the automated aerial vehicle.

19. The system of claim 18, wherein the computer processor is further configured to at least:

instruct retrieval of at least one of a first motor, a first power supply, or a first sensor included in the first configuration;

wherein instructing assembly of the first configuration includes instructing assembly of the first configuration for the automated aerial vehicle including the at least one of the first motor, the first power supply, the first sensor, the first propeller, or the first wing.

20. The system of claim 19, wherein the computer processor is further configured to at least:

responsive to a return of the automated aerial vehicle after completing the route, instruct disassembly of at least one of the first propeller, the first wing, the first motor, the first power supply, or the first sensor from the automated aerial vehicle; and instruct storage of the at least one of the first propeller, the first wing, the first motor, the first power supply, or the first sensor.

* * * * *